United States Patent
Kime

(10) Patent No.: US 9,315,960 B2
(45) Date of Patent: Apr. 19, 2016

(54) DUAL SPINNER, DUAL AUGER SALT SPREADING APPARATUS AND METHOD

(71) Applicant: H.Y.O., Inc., Columbus, OH (US)

(72) Inventor: James A. Kime, Columbus, OH (US)

(73) Assignee: H.Y.O., Inc., Columbus, OH (US)

( * ) Notice: Subject to any disclaimer, the term of this patent is extended or adjusted under 35 U.S.C. 154(b) by 217 days.

(21) Appl. No.: 14/277,930

(22) Filed: May 15, 2014

(65) Prior Publication Data

US 2015/0330045 A1   Nov. 19, 2015

(51) Int. Cl.
| | | |
|---|---|---|
| *B05B 17/04* | (2006.01) | |
| *E01H 10/00* | (2006.01) | |
| *B05B 13/00* | (2006.01) | |
| *B05B 3/10* | (2006.01) | |
| *A01C 17/00* | (2006.01) | |
| *E01C 19/20* | (2006.01) | |

(52) U.S. Cl.
CPC .............. *E01H 10/007* (2013.01); *A01C 17/00* (2013.01); *A01C 17/001* (2013.01); *B05B 3/1007* (2013.01); *B05B 13/005* (2013.01); *E01C 19/203* (2013.01)

(58) Field of Classification Search
CPC .. E01H 10/007; B05B 3/1007; B05B 13/005; A01C 17/001; A01C 17/00; E01C 19/203
USPC ............ 239/7, 657, 661, 662, 663, 667, 673, 239/675, 681
See application file for complete search history.

(56) References Cited

U.S. PATENT DOCUMENTS

| | | | | |
|---|---|---|---|---|
| 3,539,113 | A * | 11/1970 | Tyler ................... | A01C 17/001 239/667 |
| 4,763,844 | A * | 8/1988 | van der Lely ........ | A01C 15/008 239/667 |
| 7,044,408 | B2 * | 5/2006 | Schoenfeld .......... | A01C 17/001 239/673 |
| 7,172,137 | B2 * | 2/2007 | Neier ..................... | A01C 3/066 239/661 |
| 7,306,174 | B2 * | 12/2007 | Pearson .................. | A01F 12/40 239/667 |

* cited by examiner

*Primary Examiner* — Steven J Ganey
(74) *Attorney, Agent, or Firm* — Mueller Law, LLC; Jerry K. Mueller, Jr.

(57) ABSTRACT

Disclosed is a system for distribution of granular salt or brine from a vehicle. The system includes an auger assembly of a pair of powered independently rotating flighted auger sections disposed in an auger box and receiving salt stored by the vehicle. Each auger assembly has a discharge end surrounded by a choke fitting closely thereto and located at opposite ends. The system also includes a pair of powered spinner assemblies. Each spinner assembly is located beneath an auger discharge end for receiving salt from each auger assembly. Each spinner throws salt operates independently and rotates in an opposite direction. When salt is to be thrown from only one of the spinner assemblies, both of said auger assemblies rotate in the same direction for feeding the spinner assembly that is throwing salt. Nozzles directed onto each operating spinner assembly sprays brine thereonto.

18 Claims, 8 Drawing Sheets

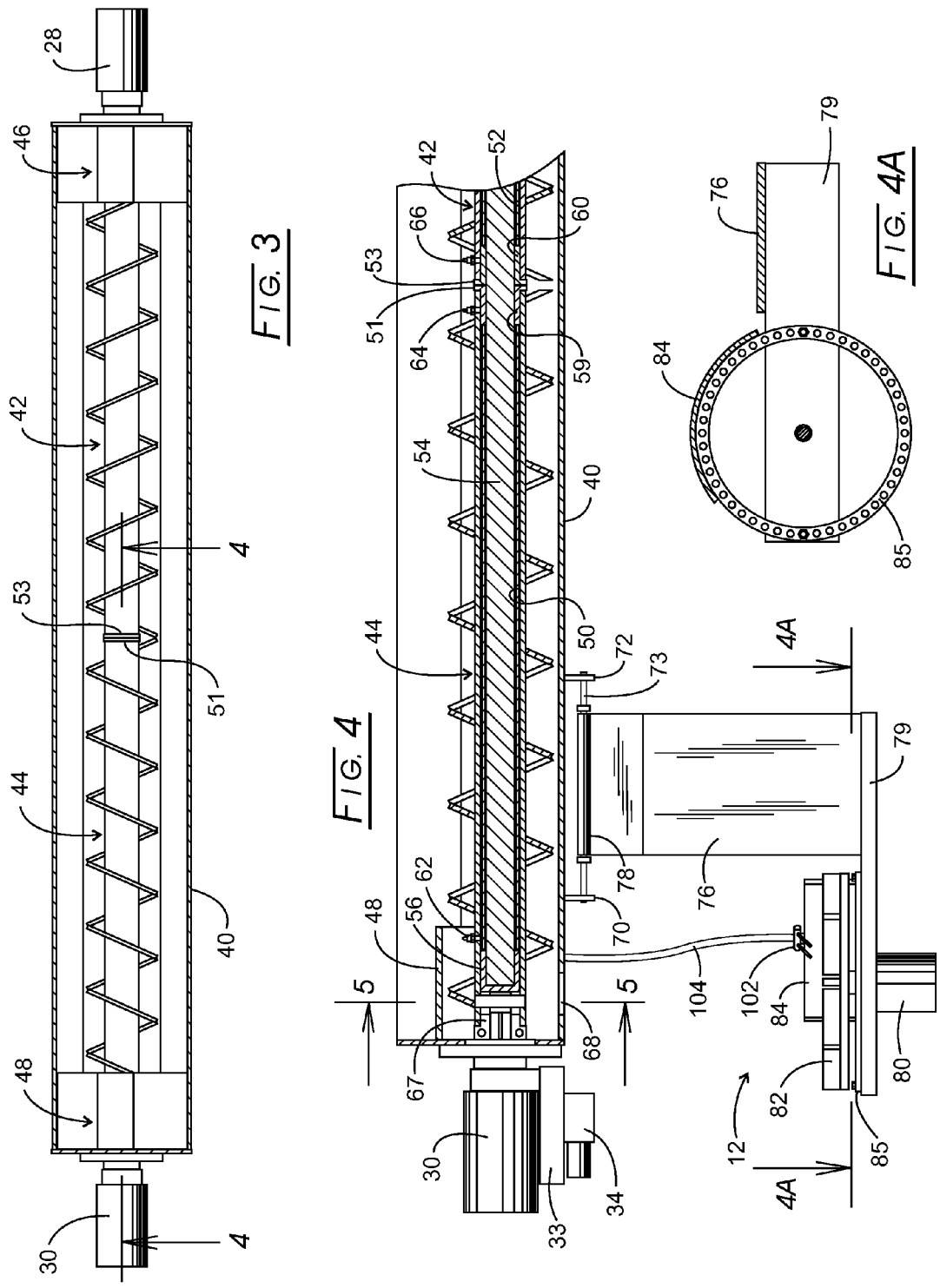

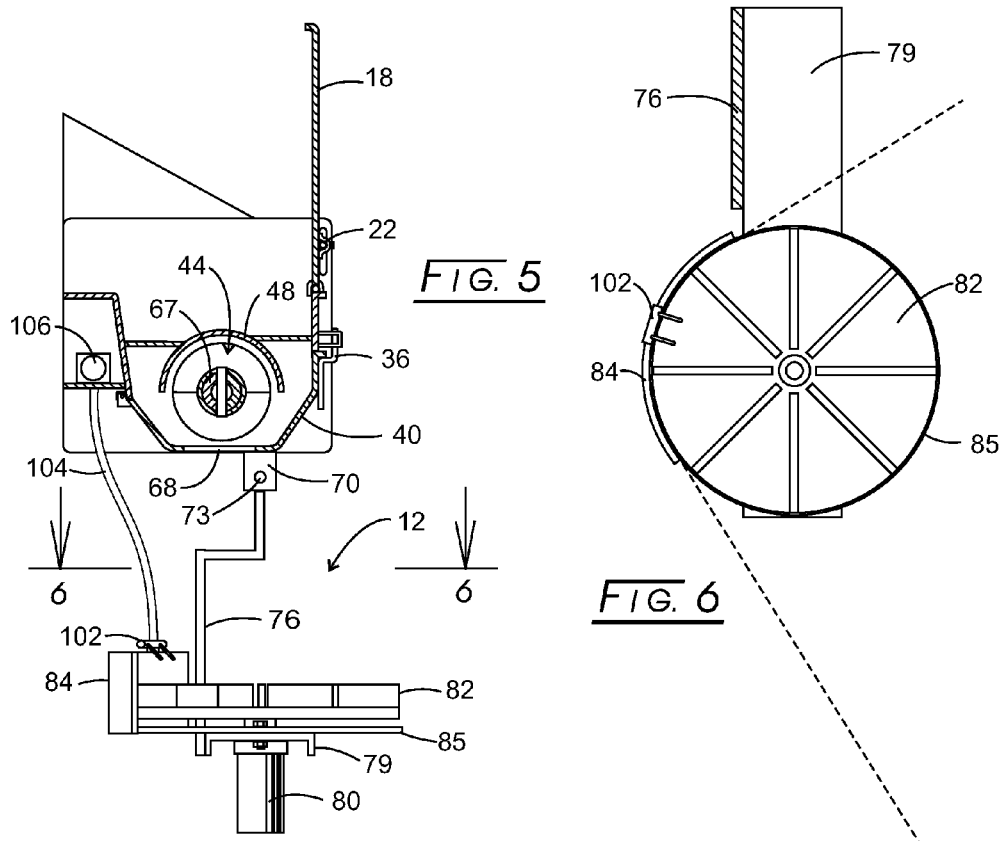
FIG. 5
FIG. 6
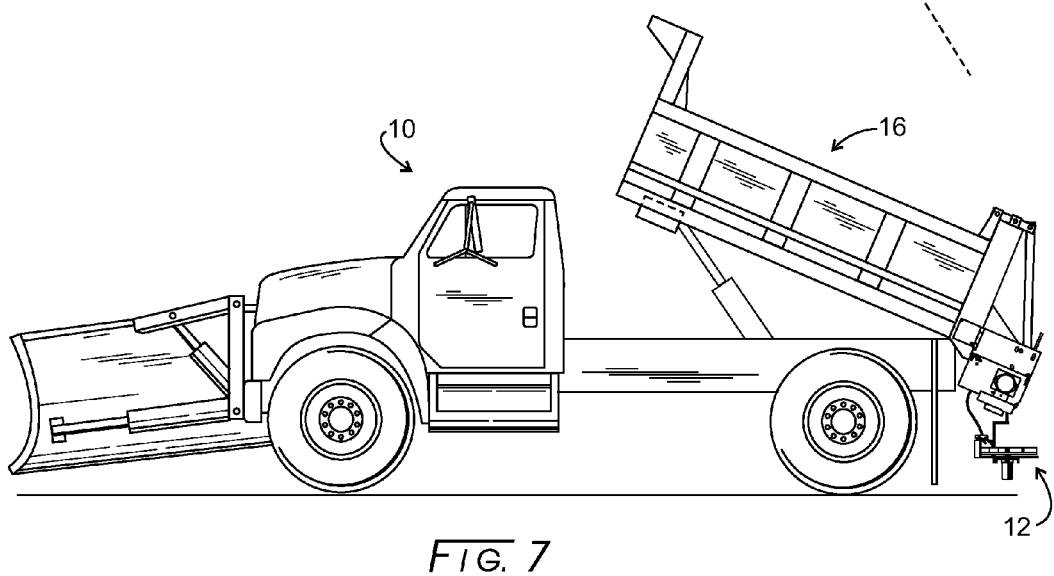
FIG. 7

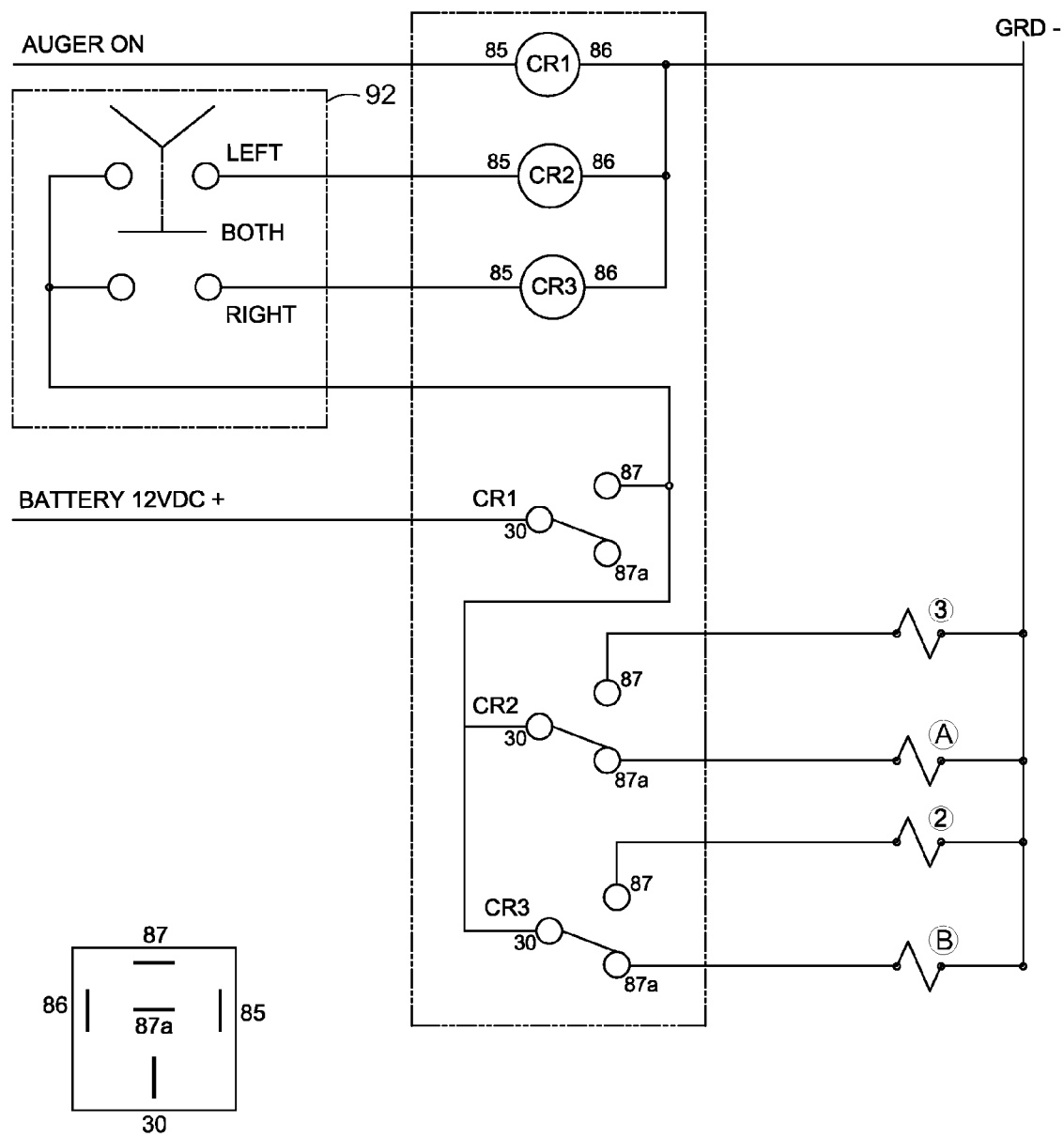

| STEPS | VALVE FLOW IN GPM | | | | | |
|---|---|---|---|---|---|---|
| | 1/4 | 1/2 | 1 | 2 | 4 | 8 |
| 1 | ● | ○ | ○ | ○ | ○ | ○ |
| 2 | ○ | ● | ○ | ○ | ○ | ○ |
| 3 | ● | ● | ○ | ○ | ○ | ○ |
| 4 | ○ | ○ | ● | ○ | ○ | ○ |
| 5 | ● | ○ | ● | ○ | ○ | ○ |
| 6 | ○ | ● | ● | ○ | ○ | ○ |
| 7 | ● | ● | ● | ○ | ○ | ○ |
| 8 | ○ | ○ | ○ | ● | ○ | ○ |
| 9 | ● | ○ | ○ | ● | ○ | ○ |
| 10 | ○ | ● | ○ | ● | ○ | ○ |
| 11 | ● | ● | ○ | ● | ○ | ○ |
| 12 | ○ | ○ | ● | ● | ○ | ○ |
| 13 | ● | ○ | ● | ● | ○ | ○ |
| 14 | ○ | ● | ● | ● | ○ | ○ |
| ... | | | | | | |
| 50 | ○ | ● | ○ | ○ | ● | ● |
| 51 | ● | ● | ○ | ○ | ● | ● |
| 52 | ○ | ○ | ● | ○ | ● | ● |
| 53 | ● | ○ | ● | ○ | ● | ● |
| 54 | ○ | ● | ● | ○ | ● | ● |
| 55 | ● | ● | ● | ○ | ● | ● |
| 56 | ○ | ○ | ○ | ● | ● | ● |
| 57 | ● | ○ | ○ | ● | ● | ● |
| 58 | ○ | ● | ○ | ● | ● | ● |
| 58 | ● | ● | ○ | ● | ● | ● |
| 60 | ○ | ○ | ● | ● | ● | ● |
| 61 | ● | ○ | ● | ● | ● | ● |
| 62 | ○ | ● | ● | ● | ● | ● |
| 63 | ● | ● | ● | ● | ● | ● |

● VALVE ON     ○ VALVE OFF

FIG. 14

DUAL SPINNER, DUAL AUGER SALT SPREADING APPARATUS AND METHOD

CROSS-REFERENCE TO RELATED APPLICATIONS

None.

STATEMENT REGARDING FEDERALLY SPONSORED RESEARCH

Not applicable.

BACKGROUND

The present disclosure relates to roadway snow and ice control and more particularly to a system that employs two spinner assemblies and a dual auger assembly that feeds both spinner assemblies or just one of the spinner assemblies with salt or a mixture of salt and brine.

A variety of commercial proposals involve spreading granular salt, brine, or brined salt on roadways for snow and ice control. Such proposals include, for example, U.S. Pat. Nos. Re 33,835, 5,318,226, 5,988,535, 6,382,535 6,446,879, and 7,108,196. A related proposal for making brine is found in U.S. Pat. No. 6,736,153.

Despite such advances in this art, inconsistence in salt spreader output from the dump truck, auger bypass, and inaccurate reporting of salt usage still exist. Considering that in a moderately severe winter, salt usage by the State of Ohio, for example, could exceed $100,000,000 annually, there is a strong drive to improve such salt roadway distribution.

One method to decrease salt usage would be to enable salt spreader trucks to place light loads (say, 100 to 200 pounds/mile). Right now minimum accurate salt usage ranges from about 400 pounds/mile on up to 1,000 pounds/mile or more.

Of course, additional improvements in the salt spreading operation could save additional governmental funds, as well as more reliably spread salt and brined salt on roadways for ice and snow control.

It is to such improvements that the present disclosure is addressed.

BRIEF SUMMARY

Disclosed is a system for distribution of granular salt and/or salt/brine mixture from a vehicle. The system includes an auger assembly of a pair of powered independently rotating flighted auger sections disposed in an auger box and receiving salt stored by the vehicle. Each auger assembly has an outer discharge end surrounded by a choke fitting closely thereto and located at opposite ends of the auger box. The system also includes a pair of powered spinner assemblies. Each spinner assembly is located beneath an auger discharge end for receiving salt from each auger assembly. Each spinner assembly throws salt independently and rotates continuously in an opposite direction. When salt is to be thrown from only one of the spinner assemblies, both of said auger assemblies rotate in the same direction for feeding the spinner assembly that is throwing salt. Nozzles directed at each spinner assembly can spray brine onto the spinner assemblies throwing salt.

A method for distribution of granular salt or brine from a vehicle also is disclosed. Such method includes providing an auger assembly that includes a pair of powered independently rotating flighted augers disposed in an auger box and receiving salt stored by the vehicle, each auger assembly having a discharge end surrounded by a choke fitting closely thereto and located at opposite ends. Also provided is a pair of powered spinner assemblies, each spinner assembly disposed beneath an auger discharge end for receiving salt from each auger assembly, each spinner assembly throws salt independently and rotates in an opposite direction. Each auger assembly is engaged to feed salt to the spinner assemblies, the spinner assemblies distributing salt onto the roadway traversed by the vehicle. Nozzles spray brine onto each spinner assembly as they throw salt onto a roadway.

BRIEF DESCRIPTION OF THE DRAWINGS

For a fuller understanding of the nature and advantages of the present method and process, reference should be had to the following detailed description taken in connection with the accompanying drawings, in which:

FIG. 3 is a sectional view taken along line 3-3 of FIG. 2;

FIG. 4 is a sectional view taken along line 3-3 of FIG. 3;

FIG. 4A is a sectional view taken along line 4A-4A of FIG. 4;

FIG. 5 is a sectional view taken along line 5-5 of FIG. 4;

FIG. 6 is a sectional view taken along line 6-6 of FIG. 5;

FIG. 7 is a left elevational view like that of FIG. 1, but with the bed of the truck in a raised position;

FIG. 9 is a block diagram of a control circuit that may be employed for the salt truck of FIG. 1;

FIG. 10 is a schematic of one of the relays illustrated in FIG. 9;

FIG. 14 is an exemplary table of the disclosed six-bit manifold valve positions.

The drawings will be described in greater detail below.

DETAILED DESCRIPTION

Figure 1:
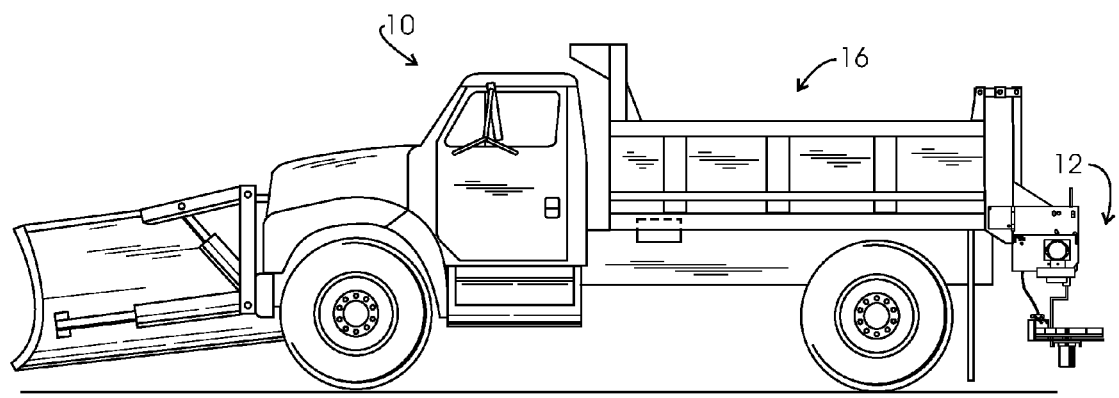
FIG. 1 is left elevational view of a truck outfitted with the dual salt spreader assemblies and other features disclosed herein.
Figure 2:
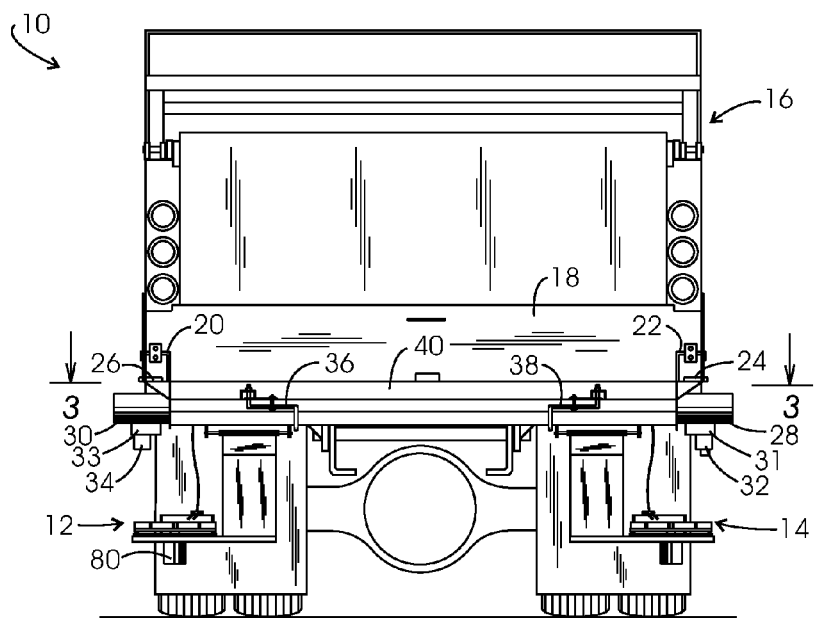
FIG. 2 is the rear elevational view of the truck of FIG. 1.

Referring initially to FIGS. 1 and 2, a salt spreader or delivery truck, 10, is illustrated in U.S. Pat. No. 6,382,535, the disclosure of which is expressly incorporated herein by reference. The '535 truck will be substantially the same as present truck 10, except for the use of the dual auger, dual spinner assemblies, and related items disclosed herein. To that end, a left side spinner assembly, 12, and right side spinner assembly, 14 (see FIG. 2), are mounted to the frame of truck 10 for dispensing salt housed within a bed, 16, carried by truck 10 (or brine when truck 10 carries brine) for dispensing salt onto roadways during seasons where snow, ice, sleet, or other frozen or semi-frozen forms of precipitation make driving on such roadways dangerous. As will evident later in this description, the use of dual spinner assemblies 12 and 14 enable truck 10 to dispense salt onto 3 lanes of roadways and onto on/off ramps, which typically are wider than the width of roadway traffic lanes. The use of dual spinner assemblies 12 and 14 also enable truck 10 to dispense salt individually from either spinner assembly and to drive either to the far right or to the far left of a roadway or highway lane to dispense salt either to the left or to the right, respectively. Such flexibility of the disclosed salt spreading system disclosed herein makes truck 10 quite useful for municipalities, cities, states, airport, military, and federal government use to make roadway, runways, and the like safer for driving during winter months.

The spreader assembly is removably affixed to bed 16 of truck 10 and does not interfere with use of the bed to conventionally unload material housed within bed 16, as is illustrated in FIG. 7. A door, 18, can drop down to access the interior of the auger box by moving latch assemblies, 20 and 22, with door 18 pivoting about hinges, 24 and 26. Motors, 28 and 30, with associated solenoid valves, 32 and 34, and manifolds, 31 and 33, respectively, drive each auger section. Another pair of latches, 36 and 38, permits a door on the bottom of the auger box to drop down for cleaning.

Referring now to FIGS. 3, 4 and 5, an auger box, 40, houses a pair of auger sections, 42 and 44. The flights of each auger section 42 and 44 are oriented to drive material (say, salt) outwardly towards each spinner assembly 12 and 14. Associated outwardly at the discharge ends of each auger section 42 and 44 are close fitting chokes, 46 and 48, formed in 3 sections, as illustrated in FIG. 3. The space between the choke and each flight is between about ⅛ and ¼ inch and ensure a reliable and consistent delivery of salt. The flights carried by each auger section are the same diameter.

Much of the detailed auger description will be for auger section 44 for simplicity, as auger section 42 is identical. As seen in FIGS. 4 and 5, each auger section 42 and 44 is hollow. Disposed within each auger section 42 and 44 are hollow plastic tubes, 50 and 52 (e.g., PVC), that serve as spacers. A floating, solid rod, 54 (e.g., chrome plated), is disposed the length of both auger sections and serves as a stiffener for the auger sections. An end cap and bearing, 56, abuts against the outer edge of hollow tube 50. A similar end cap abuts against hollow tube 52, but is not shown in the drawings. Bearings, 59 and 60, are disposed between each hollow tube 50 and 52, while bearings/bushings, 51 and 53, are disposed at the interior ends of each auger section 42 and 44. Grease fittings, 62, 64, and 66, are provided conventionally with an additional grease fitting located at the discharge end of auger section 42, but is not shown in the drawings. Finally, a clamp shaft connector, 67, clamps the motor shaft of motor 30 to auger section 44.

Spinner assembly 12 is fed salt from each auger section through an opening, 68, located on the bottom of auger box 40 with a similar opening feeding spinner assembly 14. A pair of brackets, 70 and 72, attached to auger box 40 carry spinner assembly 12. A rod, 73, is carried by apertures in each bracket 70 and 72. A sleeve, 78, in turn is mounted around rod 73, such that spinner assembly 12 rotates or pivots about sleeve 78 when bed 16 is raised to keep spinner assembly 12 in a vertical orientation. A candle lever dogleg plate, 76, is connected to a C-channel, 79, such as by welding, at its bottom end and to sleeve 78 at its upper end, again by welding. Candle lever dogleg plate 76 allows the sling flow of the salt to be unobstructed. A horizontal adjuster ring, 85, for a sling wall, 84, is mounted to the bottom of a C-channel, 79, that secures a motor, 80. There is a gap between pipe 78 and brackets 70 and 72 so spinner assembly 12 can be adjusted side-to-side and then locked in place with collars. Sling wall 84 can be secured in various locations to determine the throw of salt from spinner 82, such as can be seen in FIG. 6, depending upon a variety of factors, including, for example, speed of truck 10, rotational speed of spinner 82, weight of salt being spun (primarily moisture content), and like factors.

A nozzle assembly, 102, sprays brine onto each spinner assembly with the brine flow controlled by a solenoid, 106. When only one spinner assembly is throwing salt, brine is sprayed only onto that operating spinner assembly.

Figure 8:
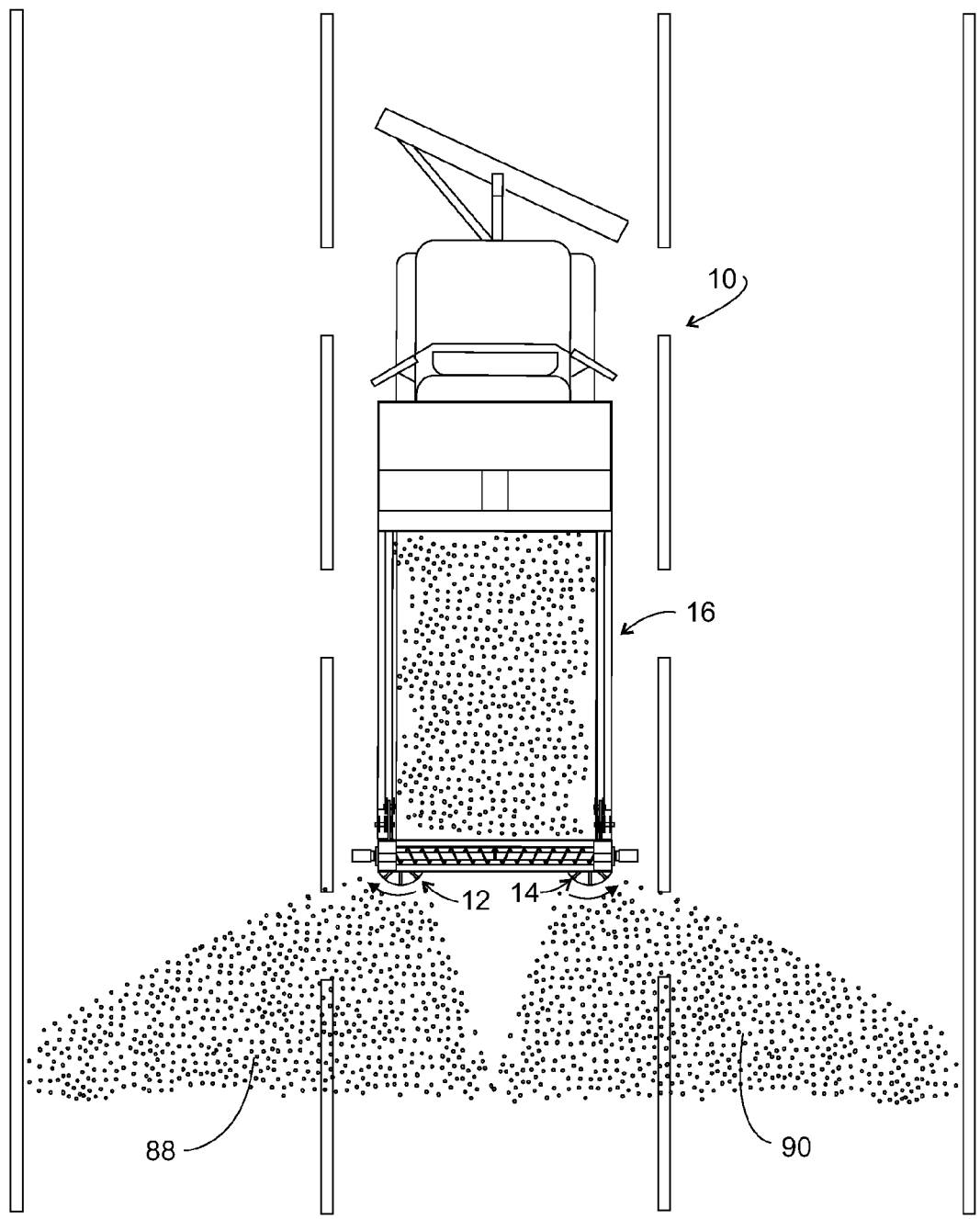
FIG. 8 is an overhead view of the truck of FIG. 1 illustrating salt being spread from both spinner assemblies to cover 3 lanes of a roadway.

In FIG. 8, spinner assembly 12 throws out a salt pattern, 88, while spinner assembly 14 throws out a salt pattern, 90. The arrows adjacent to each spinner assembly reveals that they rotate in opposite directions. When it is desired to throw salt from only one of these spinner assemblies, both auger sections rotate in the same direction and feed the chosen spinner assembly.

FIG. 9 is a block diagram of a control circuit. When the power is turned on, both auger sections and both spinners are powered on. Three relays, CR1, CR2, and CR3, are associated with the three positions of rocker switch 92. Poles 85-86 associated with relay CR1 indicates the magnetic coils in conventional fashion. FIG. 10 shows the relay bottom for a standard relay. Relay CR1 goes to position 87 when system is on and position 87*a* is the off position.

Figure 11:
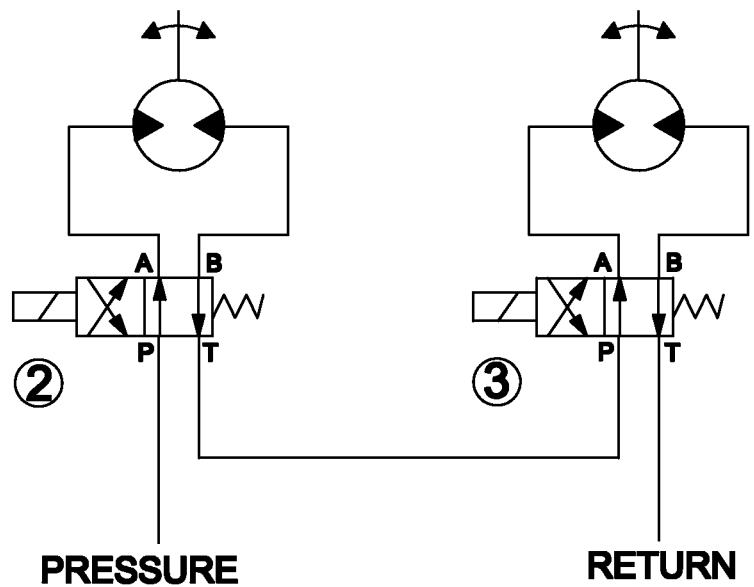
FIG. 11 is a schematic hydraulic diagram for the dual augers.

FIG. 11 is a schematic hydraulic diagram for the dual augers. The pressure side and return side are shown with the flow going through one of the augers and then in series to the other augers. It does not matter which auger is first in line. The control circuit in FIG. 9 matches with hydraulic diagram in FIG. 11 with respect to on/off indicated as solenoids ② and ③. Solenoids A and B control the spraying of brine. They can be shut off when only one spray assembly is being used.

Figure 12:
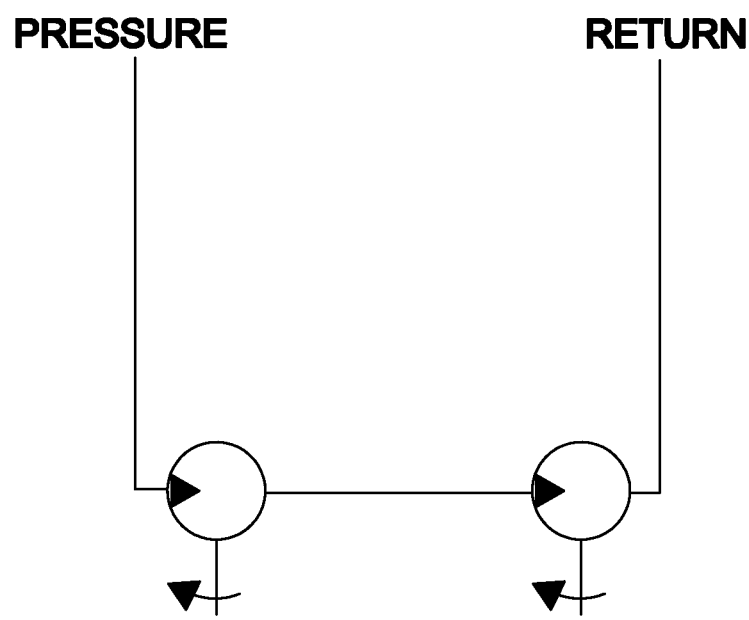
FIG. 12 is a schematic hydraulic diagram for the dual spinners.

FIG. 12 is a schematic hydraulic diagram for the spinner assemblies. The spinners do not shut off, so the flow of hydraulic fluid continues so long as the spinner assemblies are on.

Figure 13:
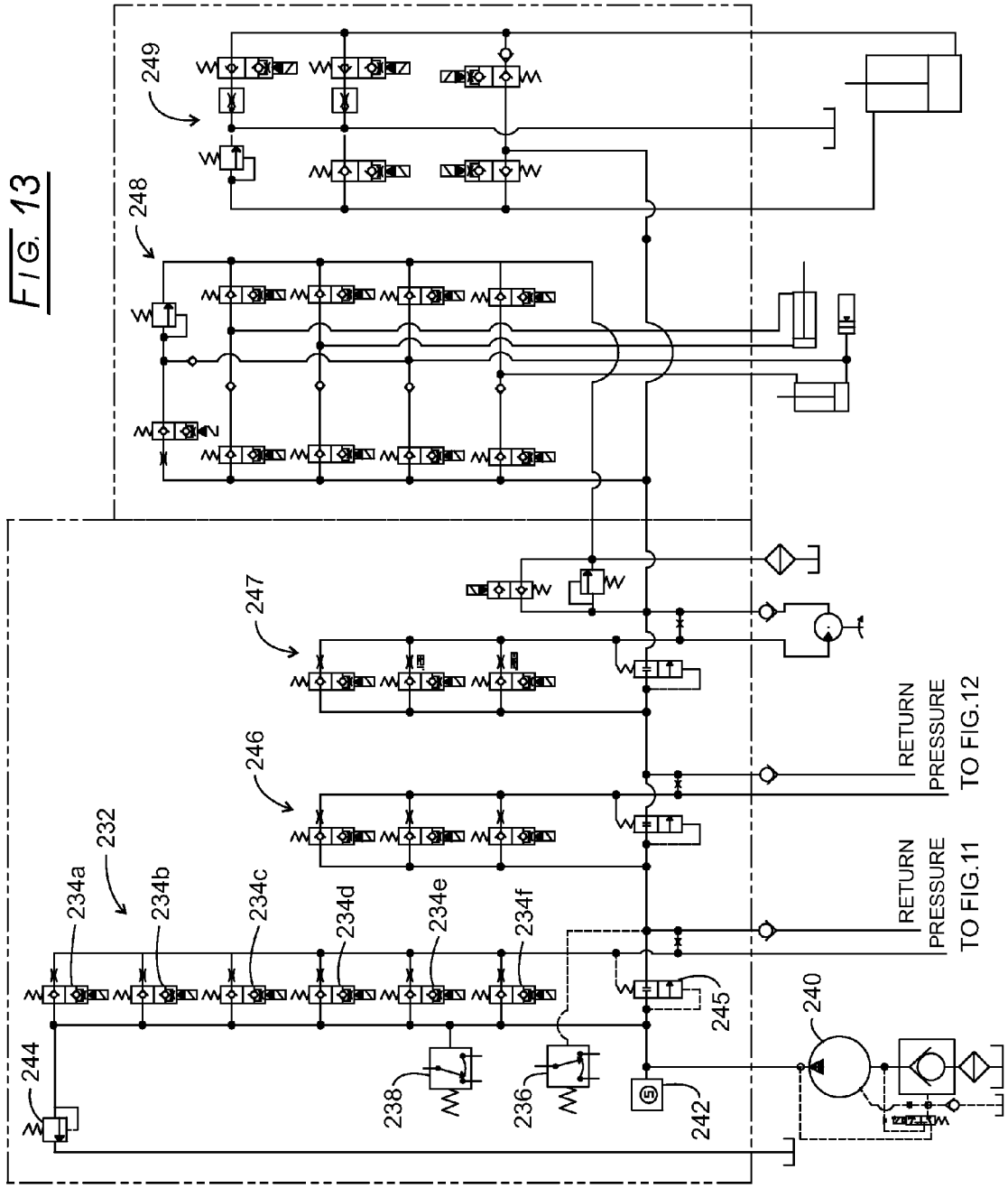
FIG. 13 is schematic hydraulic diagram showing the components employed in the 6-bit hydraulic manifold for the salt spreader on the truck of FIG. 1.

FIG. 13 is schematic hydraulic diagram showing the components employed in the 6-bit hydraulic manifold for the salt spreader on the truck of FIG. 1. In particular, the 6-solenoid valves in combination with a 6-bit manifold, 232, control flow rates. The motors for the augers are tied together so the flow is through the first motor and then the second motor in series. The same is true for the spinner motors, but only a 3-bit manifold, 246, is used. FIG. 14 displays an exemplary table, 94, of the six-bit manifold valve positions used herein, as disclosed in commonly-assigned application Ser. No. 13/972, 978, filed Aug. 22, 2013.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A system for distribution of granular salt or brine from a vehicle, which comprises:
    (a) an auger assembly comprising a pair of powered independently rotating flighted auger sections disposed in an auger box and receiving salt stored by said vehicle, each said auger section having a discharge end surrounded by a choke fitting closely thereto and located at opposite ends; and (b) a pair of powered spinner assemblies, each spinner assembly disposed beneath an auger discharge end for receiving salt from each auger assembly, each spinner assembly throws salt independently and rotates in opposite directions;

when salt is to be thrown from only one of the spinner section, both of said auger sections rotate in the same direction for feeding the spinner assembly that is throwing salt.

2. The system of claim 1, which is controlled with a 6-bit manifold.

3. The system of claim 2, wherein said 6-bit manifold uses a lookup table for determining the delivery of salt.

4. The system of claim 1, wherein a space between said choke and said flight for both of said flighted auger sections is between about ⅛ and ¼ inch.

5. The system of claim 1, wherein said spinner assemblies are pivotally mounted.

6. The system of claim 1, wherein a movable sling wall is associated with each spinner to determine the direction of throw of salt from each spinner assembly.

7. The system of claim 1, wherein each spinner assembly spins continuously.

8. The system of claim 1, wherein said auger sections are hollow and surround a continuous inner solid rod that is surrounded by a continuous hollow plastic pipe.

9. The system of claim 1, which additionally comprises:
(c) nozzles directed at each spinner assembly for selectively spraying brine onto each operating spinner assembly for each operating spinner assembly to throw a mixture of salt and brine onto a roadway.

10. Method for distribution of granular salt or brine from a vehicle, which comprises the steps of:
(a) providing:
(i) an auger assembly comprising a pair of powered independently rotating flighted auger sections disposed in an auger box and receiving salt stored by said vehicle, each said auger section having a discharge end surrounded by a choke fitting closely thereto and located at opposite ends; and
(ii) a pair of powered spinner assemblies, each spinner assembly disposed beneath an auger discharge end for receiving salt from each auger assembly, each spinner assembly throws salt independently and rotates in opposite directions;
(b) engaging said auger sections to feed salt to said spinner assemblies, said spinner assemblies distributing salt onto the roadway traversed by said vehicle, when salt is to be thrown from only one of the spinner assemblies, both of said auger sections rotate in the same direction for feeding the spinner assembly that is throwing salt.

11. The method of claim 10, wherein a 6-bit manifold controls said auger sections and said spinner assemblies.

12. The method of claim 11, wherein said 6-bit manifold uses a lookup table for determining the delivery of salt.

13. The method of claim 10, wherein a space is provided between said choke and said flight for both of said flighted auger sections and is between about ⅛ and ¼ inch.

14. The method of claim 10, additionally comprising pivotally mounting said spinner assemblies.

15. The method of claim 10, additionally providing a movable sling wall to be associated with each spinner to determine the direction of throw of salt from each spinner assembly.

16. The method of claim 10, wherein each spinner assembly spins continuously.

17. The method of claim 10, additionally comprising the step of providing said auger sections to be hollow and surround a continuous inner solid rod that is surrounded by a continuous hollow plastic pipe.

18. The method of claim 10, which additionally comprises spraying brine from nozzles onto each operating spinner assembly for each operating spinner assembly to throw a mixture of salt and brine onto a roadway.

* * * * *